Oct. 28, 1969       R. S. ZEBARTH ET AL       3,475,178
POULTRY OFFAL SEPARATION PROCESS
Filed June 27, 1967                           2 Sheets-Sheet 2
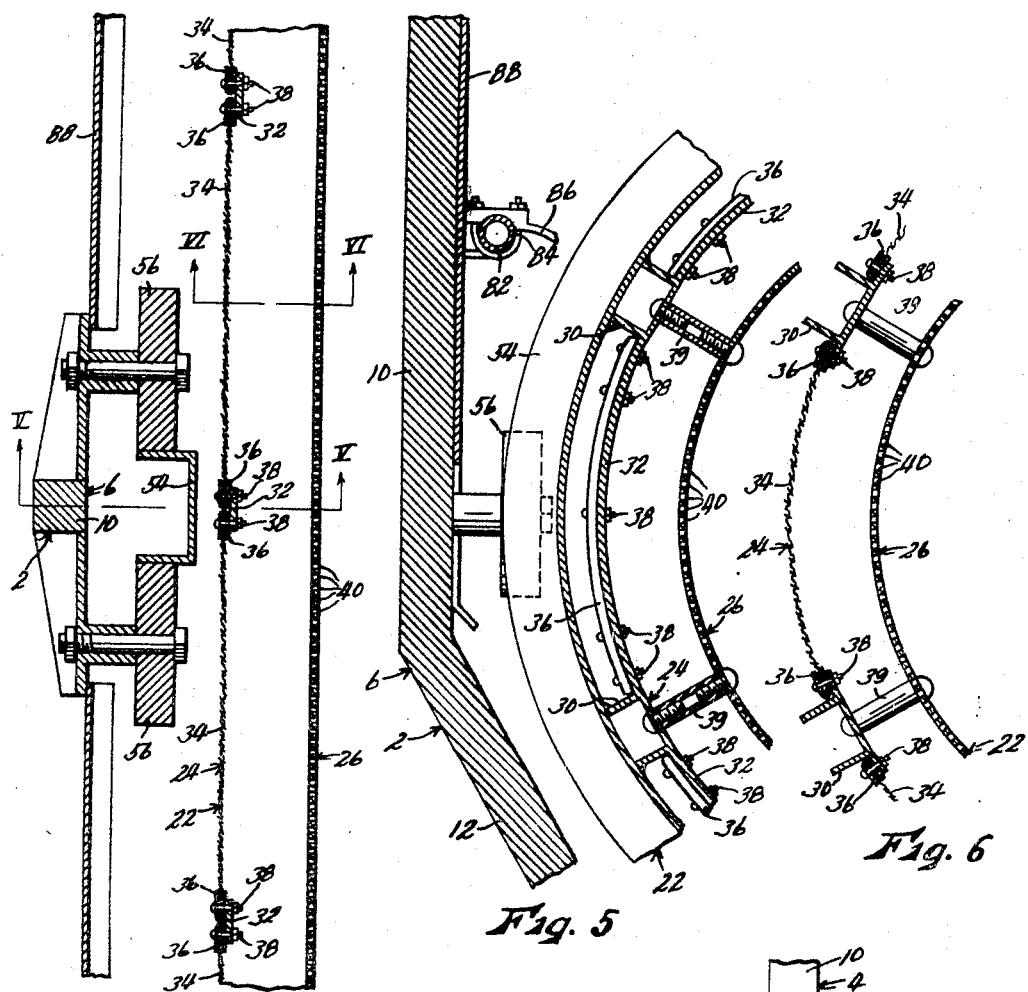
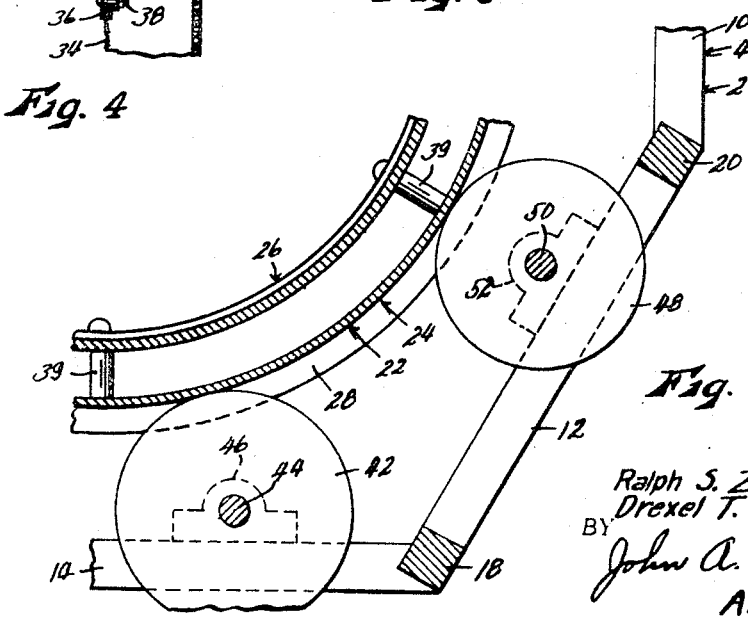
INVENTORS.
Ralph S. Zebarth
Drexel T. Carlson
BY John A. Hamilton
Attorney.

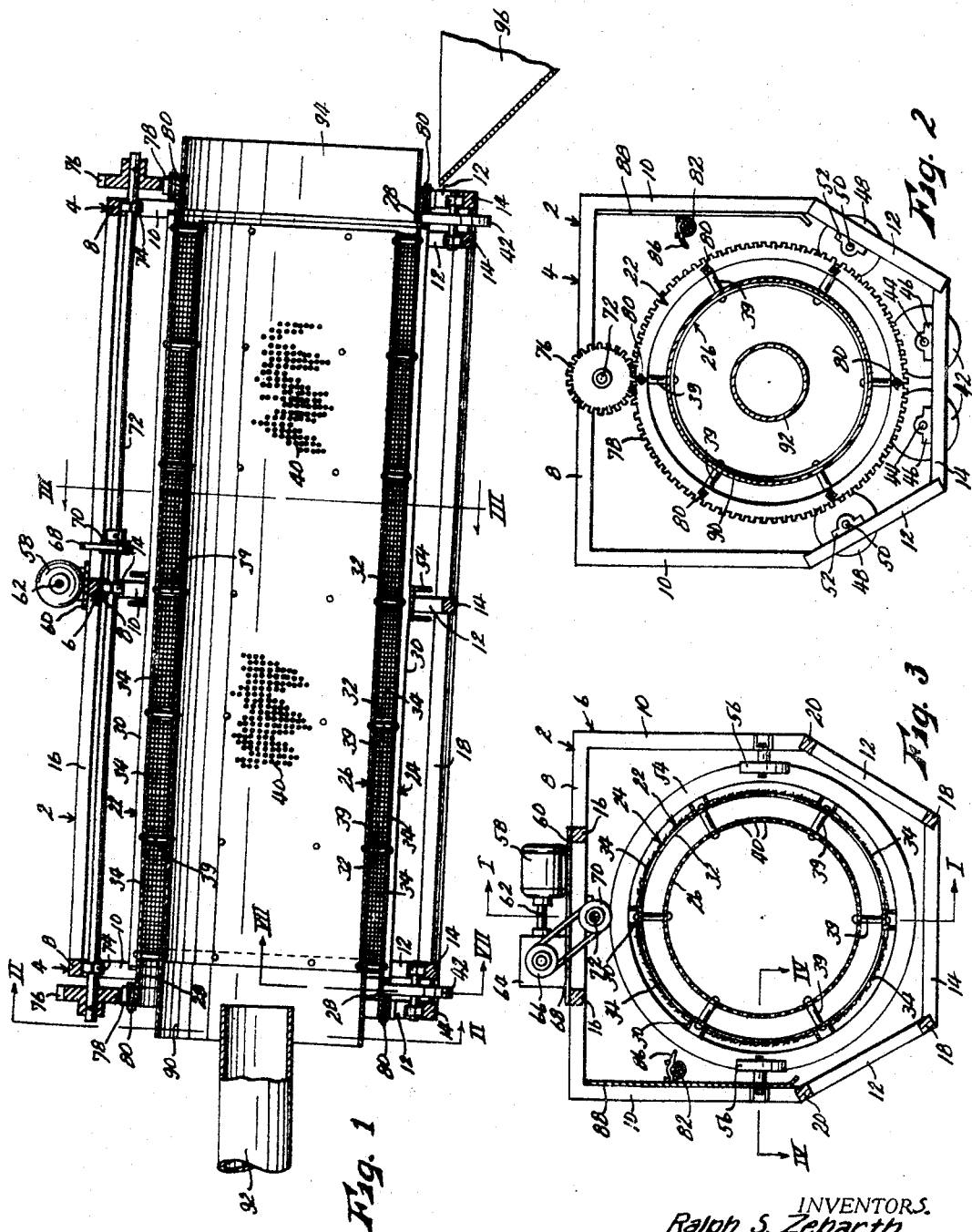

United States Patent Office 3,475,178
Patented Oct. 28, 1969

3,475,178
POULTRY OFFAL SEPARATION PROCESS
Ralph S. Zebarth, Kansas City, Mo., and Drexel T. Carlson, Leawood, Kans., assignors, by mesne assignments, to Gordon Johnson Company, Kansas City, Mo., a corporation of Missouri
Filed June 27, 1967, Ser. No. 649,241
Int. Cl. A23k 1/00; A23n 9/00
U.S. Cl. 99—7          1 Claim

ABSTRACT OF THE DISCLOSURE

This application discloses a device and method for separating water from poultry offal such as feathers, skin, viscera, fat and the like in poultry processing plants. The device consists of a rotating double drum, disposed in inclined position, into which the intermixed water and offal are introduced, the inner drum having relatively large perforations formed therein and the outer drum having very fine perforations formed therein, and means for injecting streams of clean water inwardly through said outer drum.

---

This invention relates to new and useful improvements in a method for treating waste products from poultry processing plants, and has particular reference to devices known as offal separators.

In modern poultry processing plants, the automatic picking machines of course discharge large amounts of feathers, and further processing steps such as the evisceration lines produce large quantities of heads, feet, skin, viscera, animal fat and the like, these products conjointly being designated as offal. The offal from a plant is normally conveyed from its various points of origin in the plant to a common destination for further treatment, in sluice troughs or other conduits, being washed along by large amounts of water. The offal is not discarded, being treatable by cooking or rendering for use in fertilizers, animal foods, and the like. However, as a preparatory step to such treatment of the offal, all or most of the water must be removed therefrom. Also, the water removed therefrom must be free of substantially all solid foreign matter if it is to be discarded as waste, in order to comply with current strict regulations against pollution of rivers and streams. If the water separated from the offal is sufficiently clean, it may in fact be recirculated through the offal collection conduits, thereby effecting a valuable economy by reducing the water requirements of the plant.

Various types of screen separators have heretofore been proposed and used but have not been particularly succesful or efficient, due to conditions which are particularly and pecularly present in poultry offal. The offal mass tends to be quite heavy and bulky, but also contains many very small particles such as feathers, follicles and fat globules, which of course must also be removed. Screen or sieve apertures small enough to remove these fine particles tend to reduce the water flow capacity of the screen or sieve so severely that screens or sieves of impractically large areas must be used to provide the necessary capacity. Also, screens of sufficiently small mesh are inherently structurally weak so as to be incapable of properly supporting the heavy mass of the offal, and are consequently often deformed, broken, torn or otherwise damaged by said mass, as well as by the foreign metal objects all too often dropped into the offal conveyor conduits by plant workmen, such as poultry shackles or parts thereof, eviscerating knives, bits of wire and the like. Furthermore, very fine screen apertures are quite likely to be sealed by coagulated fat globules and feather follicles, or a mixture thereof.

Accordingly, the principal object of the present invention is the provision of an offal separater which largely obviates all of the above enumerated problems, in that it provides a high capacity in a relatively small unit, protects the fine screen against the heavy mass of the offal and any possible metal foreign objects entrained therewith, provides for removal of very small particles by a fine screen, and prevents clogging of said fine screen.

Generally, these objects are accomplished by the provision of an inclined double drum rotatable about its axis, said drum consisting of inner and outer cylinders, the inner cylinder receiving intermixed water and offal therein at its upper end and being structurally quite strong with relatively large perforations, while the outer cylinder constitutes a very fine screen mesh capable of removing the smallest objectionable particles, and means for injecting streams of water inwardly through said outer cylinder to prevent clogging thereof.

Other objects are simplicity and economy of construction, efficiency and dependability of operation, ease and convenience of servicing, maintenance and repair, and adaptability for use in a wide variety of separating and straining operations.

With these objects in view, as well as other objects which will appear in the course of the specification, reference will be had to the accompanying drawing, wherein:

FIG. 1 is a longitudinal vertical sectional view of an offal separator embodying the present invention, taken on line I—I of FIG. 3, with parts left in elevation and partially broken away, FIG. 2 is a sectional view taken on line II—II of FIG. 1, FIG. 3 is a sectional view taken on line III—III of FIG. 1, FIG. 4 is an enlarged fragmentary sectional view taken on line IV—IV of FIG. 3, FIG. 5 is a fragmentary sectional view taken on line V—V of FIG. 4, FIG. 6, is a fragmentary sectional view taken on line VI—VI of FIG. 4, and FIG. 7 is an enlarged fragmentary sectional view taken on line VII—VII of FIG. 1.

Like reference numerals apply to similar parts throughout the several views, and the numeral 2 applies generally to the housing of the separator, said housing including a pair of end frames 4 and an intermediate frame 6, each of said frames having a horizontal top cross bar 8, vertical side bars 10, inwardly and downwardly converging bars 12 connected at their upper ends to the lower ends of said side bars, and bottom horizontal cross bars 14 connecting the lower ends of said converging bars; a pair of longitudinal bars 11 extending the length of the machine and interconnecting top cross bars 8; a pair of longitudinal bars 18 extending the length of the machine and interconnecting bottom cross bars 14; and a pair of longitudinal bars 20 extending the length of the machine and interconnecting side bars 10 of all of the frames. Said housing constitutes a rigid structure, and may be supported by any suitable means, not shown.

Extending axially through housing 2 is a double drum designated generally by the numeral 22 and consisting generally of an outer cylinder 24 and an inner cylinder 26 disposed substantially concentrically within said outer cylinder. Outer cylinder 24 has a rigid frame consisting of a circular hoop 28 at each end thereof and having an outwardly channel-shaped form in cross-sectional contour, a plurality of longitudinally extending channel iron ribs 30 extending between and rigidly interconnected at their ends to hoops 28 at regularly spaced angular intervals therearound, said ribs being parallel to the drum axis, and series of circular hoops 32 parallel to end hoops 28 and disposed at regularly spaced intervals therebetween, hoops 32 being permanently affixed to ribs 30. Hoops 28 and 32, together with ribs 30, form a skeleton cylindrical drum surface providing a large number of rectangular windows, each such window is covered by a panel 34 of screen wire of a mesh sufficiently fine to remove the smallest objectionable particles from water strained therethrough. For most purposes, a mesh consisting of fifty wires per inch has been found satisfactory, though obviously this may be selected as desired. Preferably, each screen panel has its edges clamped in a sheet metal frame 36 (see FIGS. 4–6), which is in turn releasably affixed to the associated hoops 28 or 32, and ribs 30, bolts 38 or other suitable fasteners, so that each panel may be individually removed when desired for repair or replacement, or to provide access to the interior of the drum.

Inner cylinder 26 of the drum is formed of a heavy-gauge sheet metal, to provide much greater strength than that of screen panels 34, and is perforated over substantially, its entire area with holes 40 which may be quite large in comparison to the interstices of screens 34. For most purposes, holes of about ⅛ inch diameter have been found satisfactory, but obviously their size may be altered as desired. Inner cylinder 26 is supported in the outer cylinder by radial connecting posts 39 affixed at their inner ends to cylinder 26, and at their outer ends to some rigid portion of the frame of the outer cylinder, such as to ribs 30.

Double drum 22 is supported in housing 2 for rotation about its geometrical axis by a cradle of rollers at each end thereof. Each end of the drum is supported, as best shown in FIGS. 2 and 7, by a pair of rollers 42, disposed respectively at opposite sides of the vertical midline of the drum and rotatably supported by shafts 44 journalled in bearings 46 affixed to bottom housing frame bars 14, and by a second pair of rollers 48 also disposed respectively at opposite sides of the vertical midline of the drum, but at a higher elevation than rollers 42, being fixed on shafts 50 journalled in bearings 52 affixed to convergent bars 12 of the housing frames. As best shown in FIGS. 1 and 7, rollers 42 and 48 engage in the channel-shaped end hoops 28 of the outer drum cylinder frame, whereby the drum is supported for rotation about its axis. The engagement of the flanges of hoops 28 with the supporting rollers 42 and 48 tends to prevent the drum from shifting longitudinally. However, since the drum must be inclined in use and support heavy loads, a considerable end thrust toward the lower end of the drum may develop, and for this reason auxiliary means are provided for bracing the drum against longitudinal movement. This means includes a heavy channel-iron hoop 54 encircling the drum midway of its length, and welded or otherwise affixed to ribs 30 of the outer drum cylinder frame, the flanges of said hoop extending radially outwardly. Each of the vertical side bars 10 of intermediate housing frame 6 has a pair of rollers 56 rotatably mounted thereon in spaced apart relation. The axes of said rollers are parallel, radial to the drum, and so spaced that said rollers engage respectively opposite flanges of hoop 54, as best shown in FIG. 4, whereby to support the drum securely against longitudinal movement.

Drum 22 is rotated at a slow rate, perhaps 10 r.p.m., by means of an electric motor 58 mounted on a platform 60 affixed to the top longitudinal bars 16 of housing 2. The driveshaft 62 of said motor acts through a speed reduction unit 64, also mounted on platform 60, to turn a pulley 66. Pulley 66 is operably interconnected by means of belt 68 to a pulley 70 affixed to a shaft 72 which extends the full length of the machine. Said shaft is parallel to and above drum 22, being journalled in bearings 74 affixed to top cross bars 8 of housing frames 4 and 6. A gear pinion 76 is affixed to each end of said shaft, and each pinion meshes with a large ring gear 78 affixed to the associated end hoop 28 of outer drum cylinder 24, as by bolts 80, said ring gears being concentric with the drum.

A water pipe 82 extends horizontally along one side of the drum, externally thereof but parallel thereto, as shown in FIGS. 2, 3 and 5. It will be understood that said pipe extends the full length of the drum and is rigidly mounted in the housing, being connected at one end to a suitable source of water under pressure, not shown, and capped at its opposite end. Said pipe has holes 84 formed therein at intervals therealong for directing streams of water against the external surface of outer cylinder 24 of the drum, and a deflector plate 86 may be attached to the pipe over each hole to spread or "fan" the stream therefrom, in order to insure that the entire exterior surface of the drum will be subjected to said streams as the drum is rotated. A splash guard plate 88 may be extended along the side of the machine outside of water pipe 82, as by being attached to the inner sides of side bars 10 of housing frames 4 and 6, to prevent water from splashing outwardly from drum 22.

In use, housing 2 is positioned to incline drum 22 at least slightly from the horizontal, as best shown in FIG. 1. The higher end of inner cylinder 26 of the drum is provided with a cylindrical, imperforate extension 90 into which projects a conduit 92 through which the intermixture of water and offal to be separated is directed into the interior of the inner drum cylinder. The lower end of outer drum cylinder 26 is similarly fitted with a cylindrical, imperforate extension 94 which extends outwardly from the machine and is disposed over a hopper 96 or other suitable receptacle for receiving offal from which the water has been separated.

The water and offal mixture is fed from conduit 92 into the upper end portion of inner drum cylinder 26 as the drum is rotated continuously at a low rate of speed. The water of course tends to pass through perforations 40 of said inner cylinder, but said perforations are too small to pass larger pieces of offal, such as most feathers, skin, viscera, heads, feet and the like which therefore remain in the inner cylinder. Small feather fragments and follicles, fat globules and other small bits of offal pass through holes 40 together with the water into outer cylinder 24. The water of course passes on through the screen panels 34 of said outer cylinder, but the mesh of the screen is sufficiently small to trap the aforementioned small offal particles, even the fat globules. The water then falls from the bottom portion of the drum along its entire length, and is collected therebeneath in a suitable drain pan or basin, not shown, from which it may be discarded to sewers, in which case it is sufficiently clean to conform to regulations against pollution of rivers and streams, or may in some cases be recirculated for further use, thereby reducing the water requirements of the plant. The offal from both cylinders of the drum tends to move gradually toward the lower end of the drum by gravity, due to the inclination of the drum, where it moves through extension 94 and falls into hopper 96, from which it is conveyed to a rendering plant or the like for further processing by any suitable means, not shown.

Thus it will be seen that an offal separator having several functional advantages has been produced. The large pieces of offal tend to form a semi-solid ropy mass due principally to the binding effect of the large quantities of feathers usually present in the offal, and this mass rolls around the inner periphery of the inner cylinder, remaining in the lower portion of said cylinder as the drum is rotated. This rolling action of the ropy mass of offal has at least two valuable functions. First, the heavy weight of the mass, which can be quite substantial toward the exit end of the drum, acts in connection with the rolling movement to force or "wring" water from the mass, so that said water, together with the fine offal particles entrained therein, can pass directly through the holes 40 of the cylinder without necessity of settling comparatively slowly through the entire mass by gravity, as is necessary in some separators. This increases the speed and efficiency of the separation, so that fully effective separation, to any degree pre-determined to be desirable can be accomplished in a shorter machine than would otherwise be practical. Second, the rolling movement of the offal mass in cylinder 26 produces a "self-cleaning" action, in that as the drum rotates and the mass rolls therein, the mass tends to bind with or adhere to offal which tends to lodge in holes 40 of the cylinder, thereby lifting or pulling said lodged offal inwardly from said holes to maintain the drum clean and free. This increases the efficiency of separation, since clogged holes obviously represent reduced capacity, and also reduces the frequency with which the machine must be cleaned. This type of self-cleaning action is enhanced by the peculiar nature of poultry offal, in which presence of fibrous feathers and animal fat imparts thereto an adherent, easily bonded consistency.

An extremely important feature of the invention is the formation of the drum with a very strong, heavy duty inner cylinder and a fine screen mesh outer cylinder, as described, with the offal being fed to the former. This relieves the fine screen mesh of the heavy load formed by the major portion of the offal. It has been found inherently impossible, or completely impractical, to provide a single cylinder drum having sufficiently small apertures to screen the smallest objectionable offal particles from the water, which at the same time is sufficiently strong to support the heavy mass of the total offal load. Instead, said offal load causes bending, deformation, tearing and rupture of such fine screens. The double-cylinder construction of the drum as shown provides a simple but effective solution for the problem. It also protects the fine screen from damage by the workmen's tools and other stray metal which frequently is deposited accidentally in the offal disposal system of a plant and which hence eventually reach the separator.

The fine feather particles, fat globules and other small offal particles which pass through holes 40 of cylinder 26 are strained from the water by screen panels 34. Purely liquid fat of course would not be separated from the water by any screen, no matter how fine a mesh, but in the present application, the fat will have had the animal heat removed therefrom by its exposure to the cooler temperatures of the water in the offal sluice troughs, and all, or nearly all, of it will therefore have solidified to globule form suspended in the water, and in this form it can be separated from the water by the screens. For this reason the spray water from pipe 82 should be cooler than body temperature, ordinary tap water being quite satisfactory. These fat globules, as well as other small bits of offal, of course tend to clog the apertures of screen panels 34, but this tendency is counteracted by the jets of clean water from pipe 82, which pass inwardly through said screens to dislodge any material tending to gather on the interior surfaces of said screens. The amount of water required for this purpose is not large, and it readily drains outwardly through the screens, and hence does not add appreciably to the moisture content of the drain offal eventually deposited in hopper 96. The division of the fine screen cylinder into a large number of separate, individually demountable panels 34 has the advantages of permitting individual servicing or replacement of each panel whenever required, and also provides easy access to the annular space between cylinders 24 and 26 whenever such access is required for cleaning of the machine.

While we have shown and described a specific embodiment of our invention, it will be readily apparent that many minor changes of structure and operation could be made without departing from the spirit of the invention as defined by the scope of the appended claim.

What we claim as new and desire to protect by Letters Patent is:

1. A method of removing water from poultry offal entrained therein, said method comprising the steps of:

feeding the offal-water admixture into the uppermost open end of an inclined perforated drum;

rotating said drum for advancing the admixture toward the lower end of the drum;

said lower end of the drum being open for discharge of large particles of offal therefrom;

collecting the water and small particles of offal passing through the perforations of the drum within an inclined tubular structure surrounding the drum in spaced relationship thereto;

rotating said structure with the drum for advancing said small particles toward the lowermost end of the structure;

said lowermost end of the structure being open for discharge of said small particles therefrom;

said structure being a relatively fine mesh screen for passage of said water therethrough as the small particles advance toward said lowermost end of the structure; and spraying cold water onto said structure for passage thereinto and into the drum to solidify fatty substances within the offal, thereby causing the water to separate from said substances.

References Cited

UNITED STATES PATENTS

| 513,973 | 2/1894 | Aulmann | 209—291 |
| 640,261 | 1900 | Beeman | 209—291 |
| 1,182,680 | 5/1916 | Hemings | 209—291 |
| 1,966,312 | 7/1934 | Rafetto | 209—291 X |
| 2,711,250 | 6/1955 | Clark | 209—291 |
| 2,748,951 | 6/1956 | Dubach | 210—403 |
| 2,765,915 | 10/1956 | Nilsson | 210—403 X |
| 3,272,632 | 9/1966 | Speer | 99—7 |

TIM R. MILES, Primary Examiner

U.S. Cl. X.R.

99—246; 210—394, 82, 77